Feb. 3, 1970  M. J. ALLEN  3,492,989
DEVICES AND METHOD FOR TREATING CERTAIN
ABNORMALITIES OF BINOCULAR VISION
Filed Aug. 22, 1968  4 Sheets-Sheet 1

INVENTOR.
MERRILL J. ALLEN
BY
Ronald F. Engel
ATTY.

Feb. 3, 1970   M. J. ALLEN   3,492,989
DEVICES AND METHOD FOR TREATING CERTAIN
ABNORMALITIES OF BINOCULAR VISION
Filed Aug. 22, 1968   4 Sheets-Sheet 2

INVENTOR.
MERRILL J. ALLEN
BY

INVENTOR.
MERRILL J. ALLEN

United States Patent Office 3,492,989
Patented Feb. 3, 1970

3,492,989
DEVICES AND METHOD FOR TREATING CERTAIN ABNORMALITIES OF BINOCULAR VISION
Merrill J. Allen, Bloomington, Ind., assignor to Indiana University Foundation, Bloomington, Ind., a corporation of Indiana
Continuation-in-part of application Ser. No. 531,418, Mar. 3, 1966. This application Aug. 22, 1968, Ser. No. 767,879
Int. Cl. A61h 5/00; A61b 5/10
U.S. Cl. 128—76.5     10 Claims

ABSTRACT OF THE DISCLOSURE

Therapeutic treatment of abnormalities of binocular vision is achieved by alternately or simultaneously stimulating the eyes (and hence the visual or striate cortices of the brain) at a predetermined frequency at or near the frequency at which the brightness enhancement phenomenon (known as the Bartley effect) has a maximum effect. To produce the desired effect, hand-held home trainers, one of which generates its own light pulses at the desired frequency and the other of which passes available light to the eyes at the desired frequency, are provided.

CROSS REFERENCE TO RELATED APPLICATION

This application is a continuation-in-part of an application entitled "Device and Method for Treating Certain Abnormalities of Binocular Vision," Ser. No. 531,418, filed on Mar. 3, 1966 and now abandoned.

BACKGROUND OF THE INVENTION

Field of the invention

This invention generally relates to the treatment of visual defects, and more specifically this invention relates to the treatment of visual defects arising from abnormal variations between the visual information supplied by one eye of a patient and the information supplied by his other eye.

Description of the prior art

In the majority of people, the two eyes function together as a unit to provide a three dimensional picture of the viewed world. In many people, though, the two eyes do not function together in a satisfactory manner. For instance, one eye may represent objects quite clearly, while the other eye represents objects in a blurred manner (anisometropia), which means that the two images cannot be fully assimilated into a unitary whole by the nervous system. As one example of the type of condition that can result from anisometropia, some people exhibit a visual abnormality known as amblyopia, in one form of which one of the eyes does not act to properly center the image being viewed on the fovea of the retina (eccentric fixation).

In other situations, the brain may block the visual path of an offending eye (suppression of vision in one eye). This visual defect may occur, for example, from anisometropia, which usually involves some discrepancy between the size, shape, and/or sharpness of the images relayed by the two eyes. A similar but normal type of behavior is that known as the retinal rivalry phenomenon, in which conflicting borders cause the images from the two eyes to be alternately dominant.

Still another example of the faulty functioning of eyes as a pair is where the image produced in one eye is improperly positioned due to turning of the eye (known as heterotropia, strabismus, or squint, all of which are generic terms covering the particular defects commonly known as cross-eye, wall-eye, and cock-eye) or to size discrepancies (aniseikonia) or other variations in the images, the brain cannot properly form a composite picture from two independent images (double-vision). If the deviation is low, it may be compensated for by a muscular effort of the individual and is called heterophoria, which may not be compensated when the individual becomes tired, causing double-vision. A double-vision condition can and often does lead to suppression of vision in one eye and/or amblyopia. Also, if occurring at an early enough age, double-vision might be overcome by the individual developing anomalous correspondence (i.e., the brain records a single image although the eyes are not aimed at the same object). Although the individual may evidence no discomfort when he experiences anomalous correspondence, there are external manifestations of the abnormality (e.g., a "crossed" eye).

In each of the examples referred to above, a neutral defense mechanism is developed to permit the person to move about in the world with a minimum of confusion (i.e., develop amblyopia, complete suppression of the images from one eye, or develop an abnormal correspondence in the brain between the images from the two eyes). While the basic optical and mechanical defects resulting in these abnormalities can be corrected by modern techniques, the neural defense mechanism is often so firmly entrenched that the man-made correction introduces little or no beneficial effect. Since the defense mechanism in such a case is hampering the person by not permitting him to achieve the quality of vision that he could have and by imposing an added and unnecessary strain on his nervous system, it is desirable to retrain the nervous system, especially the visual or striate cortices of the brain.

The neurological effects of repetitively applying light pulses to the eyes of an individual (a flickering light) are well known. Some individuals (about one in two hundred fifty) show photo-convulsive responses when viewing a flickering light source. A photo-convolusive response has the appearance of an epileptic seizure and the person experiencing the response may be unconscious for as long as thirty minutes. It has been found that most photo-convulsive response occurs when the eyes of a subject are repetitively activated by a light source at a frequency in the range of fourteen to eighteen cycles per second. In addition to the extreme results of the photo-convulsive response, about ten percent of normal individuals illustrate photo-myoclonic behavior, which involves twitching and jerking of the facial and scalpe muscles, and even the limbs in some cases.

Another response to the repetitive application of a light to a subject's eyes is known as the brightness enhancement phenomenon. The brightness enhancement phenomenon, which has been termed the Bartley effect after Dr. S. Howard Bartley, a prominent psychologist at Michigan State University, involves increased brightness perceived by a subject when viewed light is flickered in a certain range of frequencies. In the 1930's Dr. Bartley found that as viewed light was flickered at various frequencies the brightness perceived by a subject increased over the brightness of a steady illumination at that level up to a peak at nine and a half or ten cycles per second. Above the peak frequency, the enhancement effect decreases up to approximately twenty-six or twenty-eight cycles per second, at which point the Talbot effect takes over. The Talbot effect is merely the expected result that when the frequency becomes high enough, the perceived brightness would be equal to that produced by a steady stimulus having the average intensity of the flickering light.

Although the Bartley effect was published in the 1930's, no attempt has been made to utilize the results of Dr. Bartley's research in the therapeutic treatment of binocular eye disorders. Some prior art devices have utilized flickering lights in training devices, but no conscious attempt was made to utilize the Bartley effect as a training tool. Although these prior art devices may inadvertently obtain some benefit from their flickering, the frequencies utilized are so low (in the neighborhood of one tenth of a cycle to two cycles per second) the Bartley effect, and the training effect achieved by applicant, are so slight as to be almost non-existent. As examples of some of the flickering light types of devices that have been utilized for many years there are: the "Keystone Telebinocular," a stereoscopic device utilizing alternate or simultaneous illumination of right-hand and left-hand pictures; the "Wottring Rotoscope," which illustrates alternate or simultaneous illumination of targets on a revolving stage viewed through an eyepiece; the "Synoptophore" series of devices manufactured in Great Britain; and the "Troposcope," which is essentially the American version of the Synoptophore devices. None of these devices utilizes intermittent light stimulation at frequencies higher than about two cycles per second.

Another device utilizing intermittent stimulation of the eyes in an eye training procedure is that shown in U.S. Patent No. 3,277,888—Otwell. This device also utilizes a very low frequency, well below the optimum frequency of the Bartley enhancement phenomenon. In column 7 of the Otwell patent, lines 22–31, a maximum flashing rate or frequency of one hundred seventy flashes per minute (eighty-five cycles per minute for about one and a half cycles per second) is given as a maximum, while a rate of one hundred forty-eight flashes per minute (seventy-four cycles per minute or one and a quarter cycles per second) is suggested as an optimum rate. Also, the effect of the Otwell trainer is apparently based more upon shock from high light intensity than upon a frequency dependent effect. As a matter of fact, the Otwell trainer appears to be a self-training application of the recently introduced "pleoptics" method of "bleaching" or "inactivating" areas of the retina by high light intensities to cause the perceived image to be centered on the fovea. Thus, although there may be some effect on the nervous system by use of the low frequency flickering light, this is apparently not the predominant effect, as would be expected once the relationship of the enhancement phenomenon to therapeutic training is recognized.

SUMMARY OF THE INVENTION

The present invention provides devices and a method which may be simply and economically used by a patient as an adjunct to his normal treatment to greatly speed retraining and correct binocular deficiencies of the eyes. Briefly, in the preferred embodiments described herein, the present invention involves intermittent stimulation of a patint's eyes by light at a frequency at or near the peak frequency observed by Dr. Bartley for the brightness enhancement phenomenon. As used herein, the phrase "near the frequency at which the brightness enhancement phenomenon exhibits a maximum effect" is utilized to mean any frequency in the range of about three cycles per second to about twenty cycles per second. Although the Bartley enhancement phenomenon seems to exist for all frequencies up to twenty-six or twenty-eight cycles per second, the frequencies below about three cycles per second and above about twenty cycles per second exhibit such a small response of the type utilized in the present invention that they are not included in the preferred range of training frequencies.

Although prior art training devices and methods may be utilized to correct binocular vision deficiencies, they frequently involve long, drawn-out procedures, during which the patient loses interest and little is achieved in the way of useful results. Also, the retraining is frequently not wholly successful and in many cases retraining to overcome a symptom does not cancel out the underlying neurological defense mechanism. By utilizing the unexpected therapeutic effect of lights flickering at frequencies near the frequency at which the brightness enhancement phenomenon exhibits a maximum effect, remarkably rapid and effective retraining to obviate deficiencies in binocular vision may be achieved.

A pair of devices for utilizing the beneficial effects of frequencies near the frequency at which the brightness enhancement phenomenon exhibits a maximum effect are disclosed and claimed herein. In one of these devices, a light source comprising a pair of light bulbs is incorporated in the device, which also incorporates an electronic flip-flop circuit for controlling the energization of the light bulbs. When the device is turned on, the light bulbs are alternately energized at a predetermined frequency near the frequency at which the brightness enhancement phenomenon exhibits a maximum effect.

A particularly successful method of treatment utilizing this device involves placing the light bulbs against the closed eyelids of a patient and alternately energizing the light bulbs at the predetermined frequency for a period of not less than approximately two minutes. The eyes of the patient are then opened and the bulbs are placed closely adjacent to the open eyes and again energized to alternately stimulate the eyes of the patient for a period of at least approximately two minutes. These steps should be repeated throughout a plurality of time periods of given lengths which are spaced at intervals throughout the day.

With this method, the visual pathways from each eye to the visual or striate cortices of the brain are forced to convey the visual indication, and neural defense mechanisms are rendered ineffective. To make such a training device suitable for home use by the patient, it should be in a portable form. This means that a lightweight housing should be provided with a self-contained power supply and suitable space for a control circuit to regulate the switching of the light source. In one embodiment disclosed herein, the portable lightweight housing essentially corresponds to the casing of a conventional hand-held flashlight. An additional portion is added to the reflector chamber of the flashlight casing to form a space for a transistor flip-flop control circuit. The light bulbs are adjustably mounted on the end of the additional portion of the flashlight casing. The adjustable mounting feature permits regulation of the spacing between the light bulbs in order to fit the device to a patient having any size eye separation. Conventional flashlight batteries serve as a source of DC power, and a conventional flashlight switch serves as an on-off switch. This arrangement provides a handy, compact home training device to achieve the treatment described above.

Another device used in practicing the method disclosed herein involves a lightweight rotating shutter device. A projecting handle portion is connected to a circular casing which has a pair of openings formed in the casing. The openings are spaced at the approximate spacing of a person's eyes and each has two lobes. A sectored disc is positioned within the circular casing and is rotated adjacent to the openings. The sectored disc has a shape such that when a patient peers through the top lobes of the openings the eyes are simultaneously exposed to light, while when the patient looks through the bottom lobes of the opening the eyes are alternately exposed to light. This particular device works upon the same principle as the device incorporating its own light sources, but utilizes the light in the real world about the patient. Due to its utilization of the real world for the visual field, this device is particularly useful after the device incorporating the light bulb has been utilized to break down the neural defense mechanisms.

Accordingly, it is a primary object of this invention to provide a treatment to be used at home to supplement regular treatment of abnormal binocular vision.

Another object of this invention is to provide lightweight easily portable devices to provide desired home treatment for abnormalities of binocular vision.

Another object of this invention is to provide devices and a method that may be utilized to overcome neurological defense mechanisms that have been built up as a result of abnormal binocular vision.

These and other objects, advantages, and features of the subject invention will hereinafter appear, and for purposes of illustration, but not of limitation, exemplary embodiments of the subject invention are shown in the appended drawing.

DETAILED DESCRIPTION OF THE PREFERRED EMBODIMENTS

Figure 1:
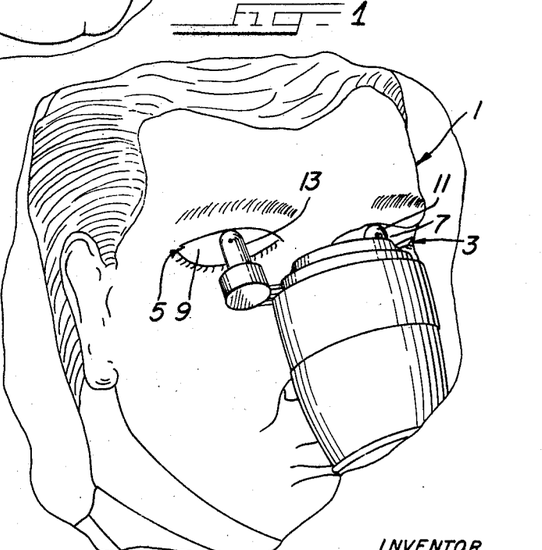
FIGURE 1 is a schematic diagram illustrating an initial step in the use of one embodiment of this invention.

With reference to FIGURE 1, it may be seen that a patient is indicated schematically at 1. The patient 1 is shown as having eyes 3, 5 with eyelids 7, 9 respectively.

A light source 11 is placed against eyelid 7, while a light source 13 is placed against eyelid 9. Light sources 11, 13 are energized through a control circuit 15 (shown in FIGURE 5). Control circuit 15, when power is supplied to the arrangement, switches light sources 11, 13 to an energized state one at a time so that an alternating or "flickering" effect of the light sources 11, 13 is achieved. The control circuit 15 de-energizes one light source as it energizes the other light source, so that a switching cycle may be defined, e.g., the switching cycle could be the energization of light source 11, and then the energization of light source 13, with the switching cycle being re-initiated by energization of light source 11.

Light sources 11, 13 are switched to the energized state at a specific rate, i.e., the alternate energization of the light sources occurs at a predetermined switching rate or frequency. The switching rate will depend to some degree upon the patient and upon the individual optometrist's views. As indicated above, some effect should be realized throughout the range of the brightness enhancement phenomenon, i.e., up to twenty-six or twenty-eight cycles per second. However, a frequency or switching rate anywhere in the range from three to twenty cycles per second effects beneficial results. Due to the photoconvulsive effects that are most frequently found in the fourteen to eighteen cycles per second range of frequencies, it is generally preferable to treat patients by utilizing frequencies in the range of four to twelve cycles per second. Further, it has been found that frequencies above the frequency at which maximum enhancement occurs (i.e., nine and a half to ten cycles per second) tend to irritate patients, and thus, in the preferred embodiments described herein, an optimum frequency or switching rate of seven to ten cycles per second is utilized.

With light sources 11, 13 placed against the patient's eyelids, each light source is energized a specified number of times. In other words, a specified number of switching cycles are consummated. It has been found that a minimum of about one thousand flashes or energizations of each of the light sources (about two minutes of treatment) will yield desirable results. The purpose of illumination through the eyelids for the first phase of the treatment is to provide uniform stimulation over the entire retinal surface of each eye.

Figure 2:
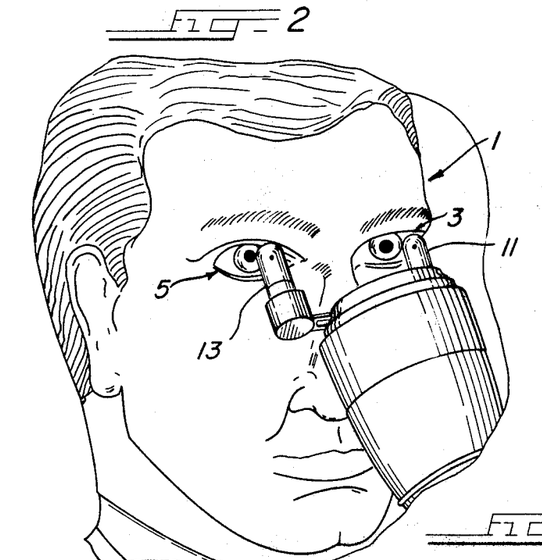
FIGURE 2 is a schematic diagram similar to FIGURE 1, but showing a subsequent step in the use of one embodiment of this invention.

After approximately two minutes of stimulation through the eyelids (1,000 flashes), the light sources 11, 13 are removed from eyelids 7, 9 and the patient opens his eyes. Light sources 11, 13 are then positioned closely adjacent the opened eyes as shown in FIGURE 2. At this time, the patient should be instructed to stare ahead so that each eye looks at the light source in front of it. With light sources 11, 13 in this position, a specified number of switching cycles is produced. As in the case when the light sources are positioned against the patient's eyelids, it has been found that a minimum of about one thousand switching cycles (about two minutes of treatment) produce desirable results. Whereas illumination through the eyelids was to provide uniform stimulation over the entire retinal surface, the purpose of open eye training is to provide localized stimulation in the foveal region, or region of maximum acuity.

The above-described steps should then be repeated until a training period of specified time duration has elapsed. A recommended length for the training period is ten minutes, but the training period may be as long as thirty minutes. A number of training periods should be fit into each day. In the preferred form of the teaching of this invention, eight training periods should be spaced throughout the day. At any rate, each training period should be followed by a minimum rest period of thirty minutes before another training period is undertaken.

When this procedure is followed, the normal visual pathway from each eye to the brain is forced into use and any neural defense mechanism is by-passed or overcome. By accomplishing this by-passing of the neural defense mechanism a large number of times at repeated intervals, the nervous system of the patient is retrained to accept the fact that the defense mechanism is no longer needed. This process will be supplementary to the patient's other treatments and provides an excellent way to continue the training techniques at home. The time that it will take for this retraining procedure and the other treatments prescribed by the optometrist to produce results will be highly variable. Factors that will affect the result time are: age of the patient, time that the neural defense mechanism has been relied upon, general health of the patient, and many others. In any event, whatever the result time, it is greatly decreased from what it would be without the efficient, easy-to-use home treatment disclosed herein.

Figure 3:
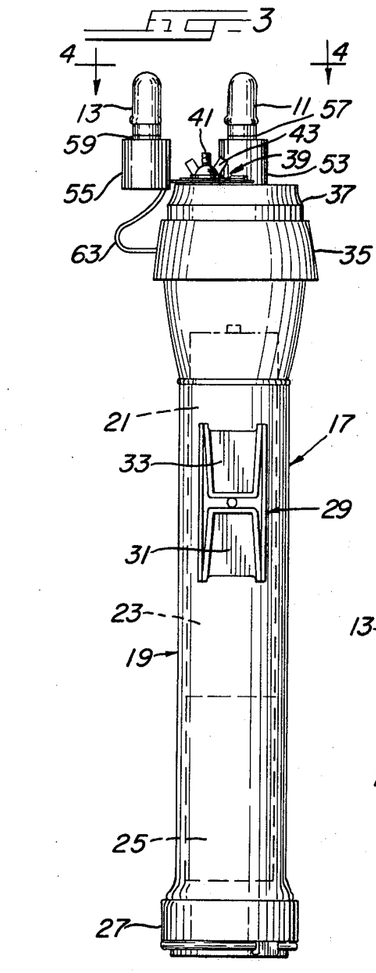
FIGURE 3 is a top plan view of a preferred embodiment of one device used in treating binocular vision defects according to this invention.

In order to make the treatment readily available to a patient at all times through the day, it is necessary to provide a portable, easily operable device. A preferred embodiment of such a device 17 is shown in FIGURE 3.

Binocular training device 17 is formed from a casing 19 that resembles a conventional hand-held flashlight casing. Casing 19 contains three conventional (i.e., 1.5 volts) flashlight batteries 21, 23 and 25. Batteries 21, 23 and 25 may be replaced by removing a threaded closure member 27. A conventional push-on, push-off switch controller 29 is located on the surface of casing 19. Switch controller 29 has a first push area 31 and a second push area 33. When pressure is applied to area 31, the device 17 will be turned on, while pressure on area 33 will turn the device 17 off. On and off conditions of device 17 are achieved by connecting DC power from the control circuit 15 and light sources 11 and 13, and disconnecting the DC power therefrom.

An enlarged area 35 of casing 19 corresponds to what would constitute the reflecting chamber of a conventional flashlight. A portion 37 is added to casing 19 beyond area 35 to form a complete closed housing for device 17. Within the space defined by area 35 and portion 37, control circuit 15 is mounted to control the switching of light sources 11, 13.

Figure 4:
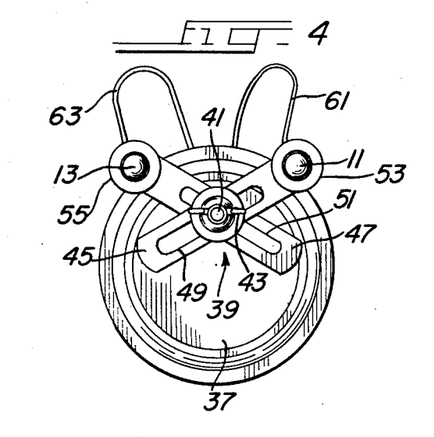
FIGURE 4 is an end view taken along line 4—4 of FIGURE 3.

Light sources 11 and 13 are mounted on the end of portion 37 by an adjustable mounting arrangement 39. Adjustable mounting arrangement 39 comprises a threaded bolt 41 and a wing nut 43. Mounting arrangement 39 further comprises a pair of generally rectangular support members 45 and 47 (as best seen in FIGURE 4). Support member 45 has a longitudinal slot 49 formed therein, while support member 47 has a slot 51 formed therein. Threaded bolt 41 passes through both of slots 49 and 51, so that by loosening wing nut 43 light sources 11 and 13 can be given two degrees of movement, i.e., a longitudinal movement along the slot and a rotary movement about bolt 41. In this manner, the light sources may be accurately adjusted to fit the eyes of any patient.

Light sources 11 and 13 are mounted on supports 45 and 47 by formed members 53 and 55 respectively. Formed members 53 and 55 contain sockets 57 and 59 respectively (only the tops of which appear in FIGURE 3). In this embodiment light sources 11 and 13 are conventional electric light bulbs (e.g., General Electric Company GE 48 or GE 49 bulbs), which may be fitted into sockets 57 and 59 respectively. One side of both of light sources 11 and 13 is connected to the DC power supply through bolt 41 and supports 45 and 47, or equivalent wires, while the other sides of the light sources are connected to appropriate points in control circuit 15 via leads 61 and 63.

Figure 5:
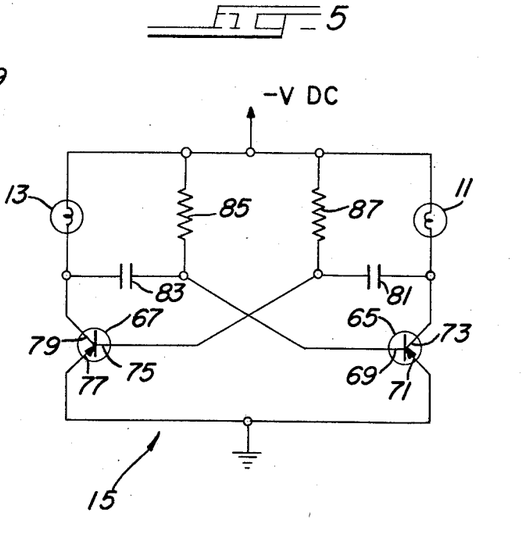
FIGURE 5 is a schematic circuit diagram of a preferred embodiment of a control circuit used in the embodiment of the subject invention illustrated in FIGURE 3.

Details of control circuit 15 may be seen by reference to FIGURE 5. In this preferred embodiment, the control circuit takes the form of a transistor flip-flop circuit, utilizing a pair of PNP transistors 65 and 67. Of course, by merely reversing the positions of batteries 21, 23 and 25, an NPN circuit could be utilized. Transistor 65 has a base 69, an emitter 71 and a collector 73, while transistor 67 has a base 75, an emitter 77 and a collector 79. Both emitter 71 and emitter 77 are connected to ground. Collector 73 is connected to one side of light source 11, and to one side of a capacitor 81. Similarly, collector 79 is connected to one side of light source 13, and to one side of a capacitor 83. Base 69 is connected to the juncture of capacitor 83 and a resistor 85, while base 75 is connected to the juncture of capacitor 81 and a resistor 87.

In operation, switch 29 will be actuated to apply power to control circuit 15. When DC power is applied to the circuit, natural imbalances will cause one or the other of transistors 65 or 67 to begin conduction. If transistor 65 is the first to conduct, an initial rush of current to capacitor 81 will make base 75 of transistor 67 go positive and will thus retain transistor 67 in the off state. After the initial rush of charging current, the current to capacitor 81 will decrease as the charge on capacitor 81 increases. Transistor 67 will begin to conduct when capacitor 81 is charged sufficiently to apply to base 75 a negative voltage of a magnitude large enough to forward bias the emitter-base junction of transistor 67. Conduction of transistor 67 will cause transistor 65 to be cut off, since base 69 will go positive as a result of the charging current to capacitor 83. The same sequence is then repeated until transistor 65 begins to conduct again. Whenever its associated transistor is in a conducting state, the light sources 11 and 13 will be energized. In this manner, a sequential alternate energization of light sources 11 and 13 is achieved.

Figure 6:
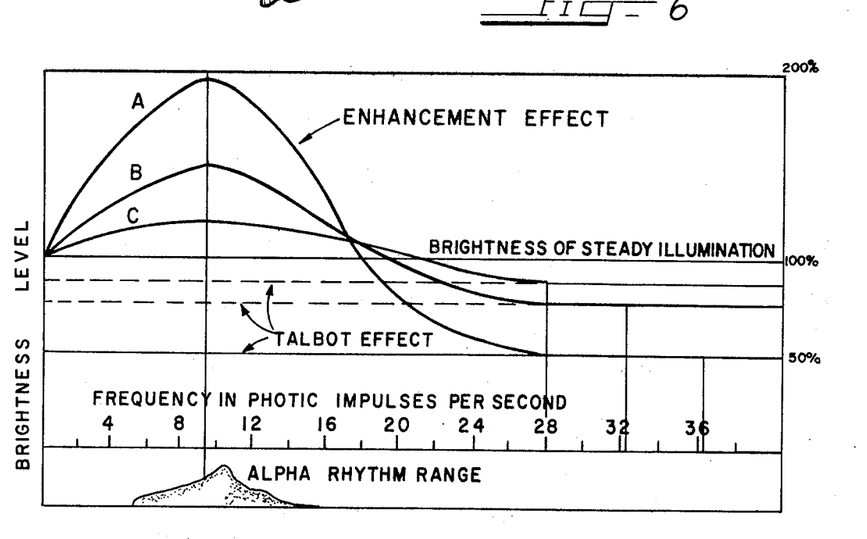
FIGURE 6 is a graph illustrating the frequency dependency characteristic of the brightness enhancement phenomenon and the relationship of that phenomenon to the alpha rhythm of the brain.

The graph of FIGURE 6 is useful in comprehending the frequency characteristics of the effect disclosed by applicant. The FIGURE 6 graph illustrated the brightness enhancement phenomenon results published by Dr. Bartley in 1939. In this test monocular stimulation of the eye was employed, but subsequent work by others on the effect reported by Dr. Bartley illustrated that there is no substantial deviation from these results when alternate binocular stimulation is utilized.

In this study three different on-off times, or light-to-dark ratios (LDR's) were utilized. The curve identified as "A" utilized a fifty percent on and fifty percent off light stimulus (an LDR of 1:1); curve "B" utilized a light stimulus that was on seventy-eight percent of the time and off twenty-two percent of the time (an LDR of 7:2); and cure "C" involved the use of an LDR of 8:1. It will be noted that the test in which a lesser on time was utilized exhibited a greater enhancement effect. In applicant's devices an LDR of 1:1 or 2:3 is normally utilized, in order to maximize the frequency effect and the benefits of the treatment, and work is now progressing on a model utilizing an LDR of 3:1. Of course, the optimum LDR is somewhat limited by the extinguishment time of light filaments and other problems inherent in the production of rapid light stimulations. While the LDR's indicated for applicant's devices are exemplary of those now being used, it must be realized that other LDR's produce beneficial results and fall within the scope of this invention and are included herein.

From the FIGURE 6 curves, it will be noted that the enhancement effect progresses steadily upward from the perceived brightness at steady illumination until it reaches a peak at about nine and a half or ten cycles per second. At this frequency, curve A with an LDR of 1:1 demonstrates that a subject perceives a brightness that is actually twice that he would perceive if there were no intermittent stimulation of the eyes and the associated nervous system. From the frequency at which the maximum enhancement effect is realized, increasing the frequency of stimulation results in a decrease of the perceived brightness until in the vicinity of twenty cycles per second, the pereceived brightness is at the level that would be perceived under steady illumination. Further increase of the frequencies of light stimulation decreases the enhancement effect until a steady state brightness level is reached in the vicinity of twenty-six or twenty-eight cycles per second. This steady state brightness is that predicted by Talbot. Talbot's law states that for rapid intermittent stimulation the perceived brightness would be equal to that produced by a steady stimulus having the same average intensity. In the case of the three curves in the FIGURE 6 graph, this would mean a steady state brightness of 50%, 78%, and 89% (of the steady illumination brightness level) of curves A, B, and C, respectively.

At the bottom of FIGURE 6, there is depicted the range of alpha rhythms of the brain that have been detected. The alpha rhythm of the brain is the dominant frequency of brain activity when the eyes are closed and the subject is not receiving any external stimulus. It will be noted from the curve that the frequency in which the largest number of brain alpha rhythms were detected is closely adjacent to the frequency in which the maximum effect achieved by the enhancement phenomenon. When the eyes of a subject are open and receiving photic stimulation, there is no single frequency that can be perceived as being the dominant brain frequency. However, by utilizing intermitten light stimulation of the eyes it has been found that the brain will exhibit a single dominant frequency, or alpha rhythm, which approaches the frequency of the light stimulation. Thus, the alpha rhythm of the brain may be altered by an application of intermittent light stimulation, an effect which has been termed photic-driving.

While taking advantage of the neurological effects of intermittent light stimulation at the frequencies in the vicinity of that in which the brightness enhancement phenomenon has a maximum effect, the above-described binocular trainer stimulates the striate cortices of the brain in a fashion not previously experienced. Due to the uniqueness of this experience, the brain has no opportunity to exert the defense mechanisms that it has developed to overcome the deficiencies in binocular vision. Those defense mechanisms that have been developed are bypassed or rendered ineffective and the optical nervous system functions in a normal fashion. The advantage of applicant's frequency effect for training purposes results because the patient's defence mechanisms are rendered ineffective beyond the time during which the eyes are being intermittently stimulated. Therefore, utilization of the binocular training method of this invention with other recognized eye training procedures produces extremely beneficial results.

Besides straight intermittent stimulation of the eyes, the training mechanism described above may be utilized in various eye procedures. For instance, it is known that the striate cortices of the brain are interconnected by the corpus callosum. In normal vision, the perceived image is divided at the fovea with one half of the image being on the nasal retina of an eye and the other half being on the temporal retina of the eye. The images on the nasal retina of one eye and the temporal retina of the other eye are conveyed to one striate cortex, while the images on the other nasal retina and the other temporal retina are conveyed to the other striate cortex of the brain. Utilizing this knowledge, many various training procedures may be utilized. As one example, the light bulbs could be placed close together so that only the temporal retinas of the eyes are stimulated. Thus, only one cortex of the brain would be receiving impulses while one of the light bulbs is energized, and the other cortex would receive impulses only while the other light bulb is energized. By utilizing the flickering light, this alternating stimulation of the cortices of the brain would result in an oscillating flow of impulses through the corpus callosum. The oscillating flow of impulses could then be utilized in the treatment of certain binocular vision problems.

Figures 7, 8, 9:
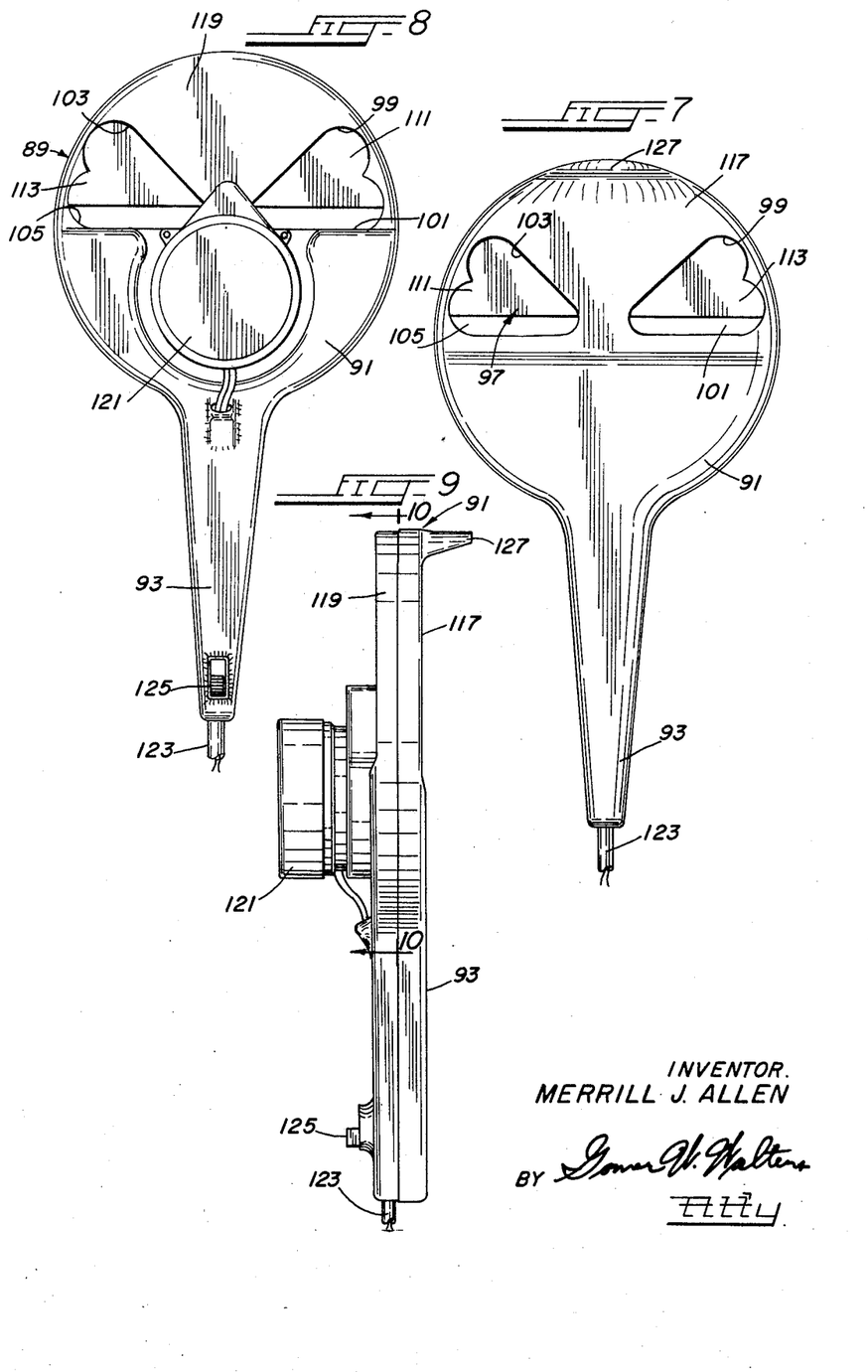
FIGURE 7 is a front elevational view of a preferred embodiment of another device used in treating binocular vision defects according to the subject invention.
FIGURE 8 is a rear elevational view of the embodiment of the device illustrated in FIGURE 7.
FIGURE 9 is a side view of the embodiment of the invention illustrated in FIGURE 7.

As previously indicated, the device illustrated in FIGURE 3 is useful for an initial therapeutic treatment because of the unusual experience that it produces for the eye to render ineffective defense mechanisms adopted by the brain. In FIGURE 7 another training device utilizing intermittent light stimulation at frequencies in the vicinity of the frequency at which an optimum effect is achieved from the enhancement phenomenon. This device is particularly useful as a follow-up to the device illustrated in FIGURE 3, since a real world field of vision is utilized. By using a real world field of vision, this device permits training by intermittent light stimulation at the desired frequency, and yet it does not cause the patient to lose interest, as he can survey the world about him.

As illustrated in FIGURES 7 and 8, training device 89 has a circular casing 91 and an extending handle portion 93. A pair of openings 95 and 97 are formed in and extend completely through circular casing 91. Openings 95 and 97 are heart shaped, with opening 95 having an upper lob 99 and a lower lobe 105.

Figure 10:
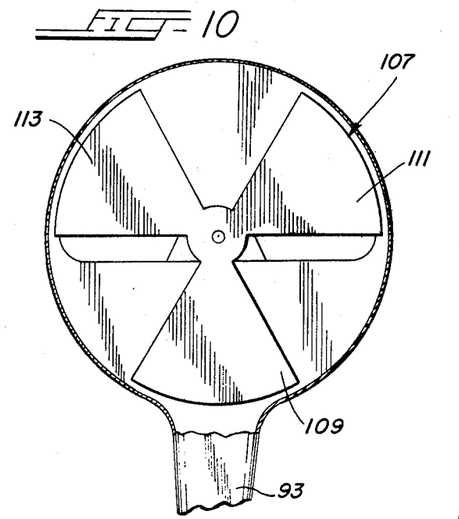
FIGURE 10 is a partial cross sectional view taken along line 10—10 of FIGURE 9 illustrating a sectored rotating disc utilized in this embodiment of the invention.

Openings 95 and 97 are intermittently closed and opened due to passage of a rotating sectored disc 107. In FIGURE 10, it may be seen that sectored disc 107 has three extending arms 109, 111, and 113. The arms of sectored disc 107 are structured so that as the disc is rotated past openings 95 and 97 lobes 99 and 103 will be simultaneously opened and shut, while lobes 101 and 105 will be alternately opened and shut. Thus a patient may look through the upper lobes 99 and 103 to have his eyes simultaneously exposed to the light from his field of vision. On the other hand, the patient may look through the lower lobes 101 and 105 to have his eyes alternately exposed to light from his field of vision.

The rotating sectored disc 107 is located in an internal cavity of circular casing 91, the cavity being formed between surfaces 117 and 119 of circular casing 91. Disc 107 is driven by a motor 121 located on the back surface 119 of circular casing 91. Electrical energy for the motor 121 is provided through a cord 123 which extends through the handle portion 93. Cord 123 may be plugged into any conventional outlet to permit driving of the sectored disc. A switch 125, located on handle portion 93, controls energization of motor 121, and hence rotation of sectored disc 107.

As may best be seen in the side view of FIGURE 9, the front surface 117 of circular casing 91 is adapted to fit the face of a patient and locate his eyes in the proper position for the training procedure. A protrusion 127 is formed at the upper portion of the surface 117 to engage the forehead of a patient and keep his eyes at the proper distance from openings 95 and 97.

In operation, the patient merely turns on switch 125 to cause rotation of sectored disc 107 and then surveys the surrounding world through openings 95 and 97. The intermittent stimulation achieved by intermittently exposing the patient's eyes to light from the surrounding world achieves the desired therapeutic treatment. Also, a red filter may be put over one of the openings 95 and 97, and a green filter over the other of the openings. By utifizing the device 89 as thus modified, the desirable treatment achieved by applicant may be combined with the well-known anagylphic treatment of binocular vision problems.

It should be understood that the embodiments described are exemplary of the preferred practive of the present invention and that various changes, modifications, and variations may be made in the arrangements, details of construction, and operations of the elements disclosed herein, without departing from the spirit and scope of the present invention.

What is claimed is:

1. A device for treating abnormalities of binocular vision comprising:
 a hand-held device having a circular portion and an extending handle portion;
 an opening for each eye of a patient formed in said circular portion, each of said openings being formed with upper and lower lobes;
 a shutter in said circular portion adapted to alternately cover and expose said openings, said shutter being formed so that both of the upper lobes will be simultaneously covered and exposed and the lower lobes will be alternately covered and exposed; and
 energizing means for driving said shutter at a speed that causes light to intermitently pass through said openings at a predetermined frequency in the range from about four cycles per second to about twelve cycles per second, said predetermined frequency thus being near the frequency at which the brightness enhancement phenomenon exhibits a maximum effect,
 whereby the visual pathways from the eyes of the patient to his brain are repeatedly forced into use to render ineffective neural defense mechanisms acquired by the patient to compensate for his visual abnormality.

2. A device for treating abnormalities of binocular vision comprising:
 a hand-held device having a circular portion and an extending handle portion;
 an opening for each eye of a patient formed in said circular portion, each of said openings being formed with upper end lower lobes;
 a shutter in said circular portion adapted to alternately cover and expose said openings, said shutter being formed so that both of the upper lobes will be simultaneously covered and exposed and the lower lobes will be alternately covered and exposed; and energizing means for driving said shutter at a speed that causes light to pass through said openings at a predetermined frequency.

3. A device as claimed in claim 2 wherein:
each of said openings is heart-shaped with the points of the hearts located near the center of said circular portion adjacent each other; and
said shutter is a sectored disc having three equally spaced wedge-shaped arms extending from a central section thereof.

4. A device for treating abnormalities of binocular vision comprising:
a cylindrical casing containing a source of electrical energy and adapted to be held by a patient;
an enlarged portion at one end of said casing;
a cylindrical enclosure extending from said enlarged portion;
a switching circuit module located in said enlarged portion and said cylindrical enclosure, said switching circuit module having a predetermined switching frequency in the range from about four cycles per second to about twelve cycles per second;
first electrical circuit means interconnecting said electrical energy source and said switching circuit module;
switch means on said casing for opening and closing said first electrical circuit means;
a pair of generally rectangular supporting members, each supporting member having a longitudinal slot adjacent a first end thereof;
a light source secured to the second end of each of said supporting members;
a mounting member extending through said slots;
a releasable mounting fastener attached to said mounting member and releasable for adjusting the positioning of said light sources to fit the eyes of a patient; and
second electrical circuit means interconnecting said switching circuit module and said light sources, said switching circuit module alternately energizing said light sources at said predetermined frequency, when said switch means is actuated to close said first electrical circuit means, to produce a flicker having a frequency near the frequency at which the brightness enhancement phenomenon exhibits a maximum effect,
whereby positioning the light sources adjacent the eyes of a patient will repeatedly force the visual pathways from the eyes of the patient to his brain into use to render ineffective neural defense mechanisms acquired by the patient to compensate for his visual abnormality.

5. A device as claimed in any one of claims 1 and 4 wherein said predetermined frequency is in the range of seven to ten cycles per second.

6. A method for treating abnormalities of binocular vision comprising:
arranging for light to impinge upon the eyes of a patient; and
periodically interrupting the impingement of light upon the patient's eyes at a predetermined frequency in the range from about four cycles per second to about twelve cycles per second to repetitively activate the striate cortices of the brain a said predetermined frequency, said predetermined frequency being near the frequency at which the brightness enhancement phenomenon achieved by repetitive light stimulation of the eyes exhibits a maximum,
whereby neural defenses acquired by the patient to compensate for his visual abnormality are rendered ineffective.

7. A method as claimed in claim 6 and further comprising:
placing a hand-held device having openings therein before the eyes of the patient; and
energizing a shutter in said device to rotate at a speed sufficient to interrupt the ambient light impinging on the eyes of the patient at said predetermined frequency.

8. A method as claimed in claim 6 and further comprising:
applying a light source to each eye of the patient;
generating an energizing electrical signal for each of said light sources; and
switching said electrical signal from one to the other of said light sources in an alternating fashion to alternately energize said light sources at said predetermined frequency.

9. A method as claimed in claim 8 and further comprising:
positioning said light sources against respective closed eyelids of the patient so that light from said light is diffused over the surface of the retinas of the respective eyes;
retaining said light sources against the patient's eyelids for a minimum time of approximately two minutes;
removing said light sources from the patient's eyelids;
positioning said light sources closely adjacent the patient's open eyes; and
retaining said light sources closely adjacent the patient's eyes for a minimum time of approximately two minutes,
whereby the visual pathways from the photoreceptors in each eye of the patient to his brain are repeatedly forced into use to activate the associated striate cortex.

10. A method as claimed in any one of claims 6 and 8 wherein said predetermined frequency is in the range of seven to ten cycles per second.

References Cited

UNITED STATES PATENTS

| | | | |
|---|---|---|---|
| 2,831,481 | 4/1958 | Radin | 128—76.5 |
| 3,213,851 | 10/1965 | Currea | 128—1 |
| 3,277,888 | 10/1966 | Otwell | 128—76.5 |

FOREIGN PATENTS

| | | |
|---|---|---|
| 921,750 | 3/1963 | Great Britain. |

WILLIAM E. KAMM, Primary Examiner (5/69)

CERTIFICATE OF CORRECTION

Patent No. 3,492,989     Dated February 3, 1970

Inventor(s) Merrill J. Allen

It is certified that error appears in the above-identified patent and that said Letters Patent are hereby corrected as shown below:

Column 2, line 18, delete "neutral" and insert therefor -- neural --; and
line 49, delete "scalpe" and insert therefor -- scalp --.

Column 8, line 15, delete "cure" and insert therefor -- curve --; and
line 52, delete "of" and insert therefor -- for --.

Column 9, line 11, delete "defence" and insert therefor -- defense --; and
line 60, delete "lob" and insert therefor -- lobe --.

Claim 5, Column 11, line 54, delete "1 and 4" and substitute therefor -- 1-4 --.

Claim 6, Column 12, line 3, delete "a" and substitute therefor -- at --.

Claim 10, Column 12, lines 48 and 49, delete "6 and 8" and substitute therefor -- 6-9 --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents